April 25, 1961 W. R. BEALL ET AL 2,981,466
READ-OUT SYSTEM FOR A VALUE REGISTERING DEVICE
Filed Aug. 26, 1955 7 Sheets-Sheet 1

INVENTORS,
William R. Beall &
Kenneth F. Oldenburg
BY
ATTORNEY

April 25, 1961 W. R. BEALL ET AL 2,981,466

READ-OUT SYSTEM FOR A VALUE REGISTERING DEVICE

Filed Aug. 26, 1955 7 Sheets-Sheet 2

INVENTORS,
William R. Beall &
Kenneth F. Oldenburg

BY Fred H. Schwend

ATTORNEY.

READ-OUT SYSTEM FOR A VALUE REGISTERING DEVICE

Filed Aug. 26, 1955

INVENTORS,
William R. Beall &
Kenneth F. Oldenburg
BY
[signature]
ATTORNEY.

INVENTORS,
William R. Beall &
Kenneth F. Oldenburg
BY
Fred N. Schwend
ATTORNEY.

April 25, 1961 W. R. BEALL ET AL 2,981,466

READ-OUT SYSTEM FOR A VALUE REGISTERING DEVICE

Filed Aug. 26, 1955 7 Sheets-Sheet 5

INVENTORS,
William R. Beall &
BY Kenneth F. Oldenburg
Fred N. Schwend
ATTORNEY.

READ-OUT SYSTEM FOR A VALUE REGISTERING DEVICE

Filed Aug. 26, 1955 7 Sheets-Sheet 6

INVENTORS,
William R. Beall &
Kenneth F. Oldenburg
BY Fred N. Schwend
ATTORNEY.

INVENTORS,
William R. Beall &
Kenneth F. Oldenburg
BY
[signature]
ATTORNEY.

2,981,466

READ-OUT SYSTEM FOR A VALUE REGISTERING DEVICE

William R. Beall, Glendale, and Kenneth F. Oldenburg, Monterey Park, Calif., assignors to Clary Corporation, San Gabriel, Calif., a corporation of California Filed Aug. 26, 1955, Ser. No. 530,693

2 Claims. (Cl. 235—60.4)

This invention relates to read-out systems for value registering devices, such as electronic counters, accumulators, computers, etc., and has particular reference to read-out systems for deriving information from devices of the above type having associated therewith circuitry to produce stepped registering potentials which vary in accordance with the values registered.

Such value registering devices or counters are disclosed, for example, in the patents to White, 2,113,011, issued on April 5, 1938; Riggen, 2,517,712, issued on August 8, 1950; and Houghton, 2,540,524, issued on February 6, 1951. In such devices the circuitry presents a stair case or stepped type voltage form having a plurality of steps or voltage levels which advance either upwardly or downwardly in accordance with progressively higher values registered thereby. For example, in Houghton, an upwardly stepped voltage output, as shown in Fig. 2*b* thereof, is derived from the output line 16.

A principal object of the present invention is to provide a read-out system which is responsive to potentials of progressively different magnitudes corresponding to progressively different values.

Another object is to provide a simple and economical read-out system for a counter or the like value registering device in which a minimum number of wire leads to such device are needed.

Another object is to provide a read-out system for a counter or the like device in which only a single wire connection need be made to each decade of the device.

Another object is to provide a read-out system for a multi-decade counter or the like in which interconnections between various decades of the device need not be changed or broken in order to effect a read-out operation.

Another object is to provide a read-out system for a multi-decade counter or other value registering device in which information is concurrently obtained from all decades of the counter.

Another object is to provide a read-out system for an electronic counter or other registering device in which the registering device is not disturbed during a read-out operation.

The manner in which the above and other objects of the invention are accomplished will be readily understood on reference to the following specification when read in conjunction with the accompanying drawings, wherein.

*Counter decade circuitry*

Figure 1:
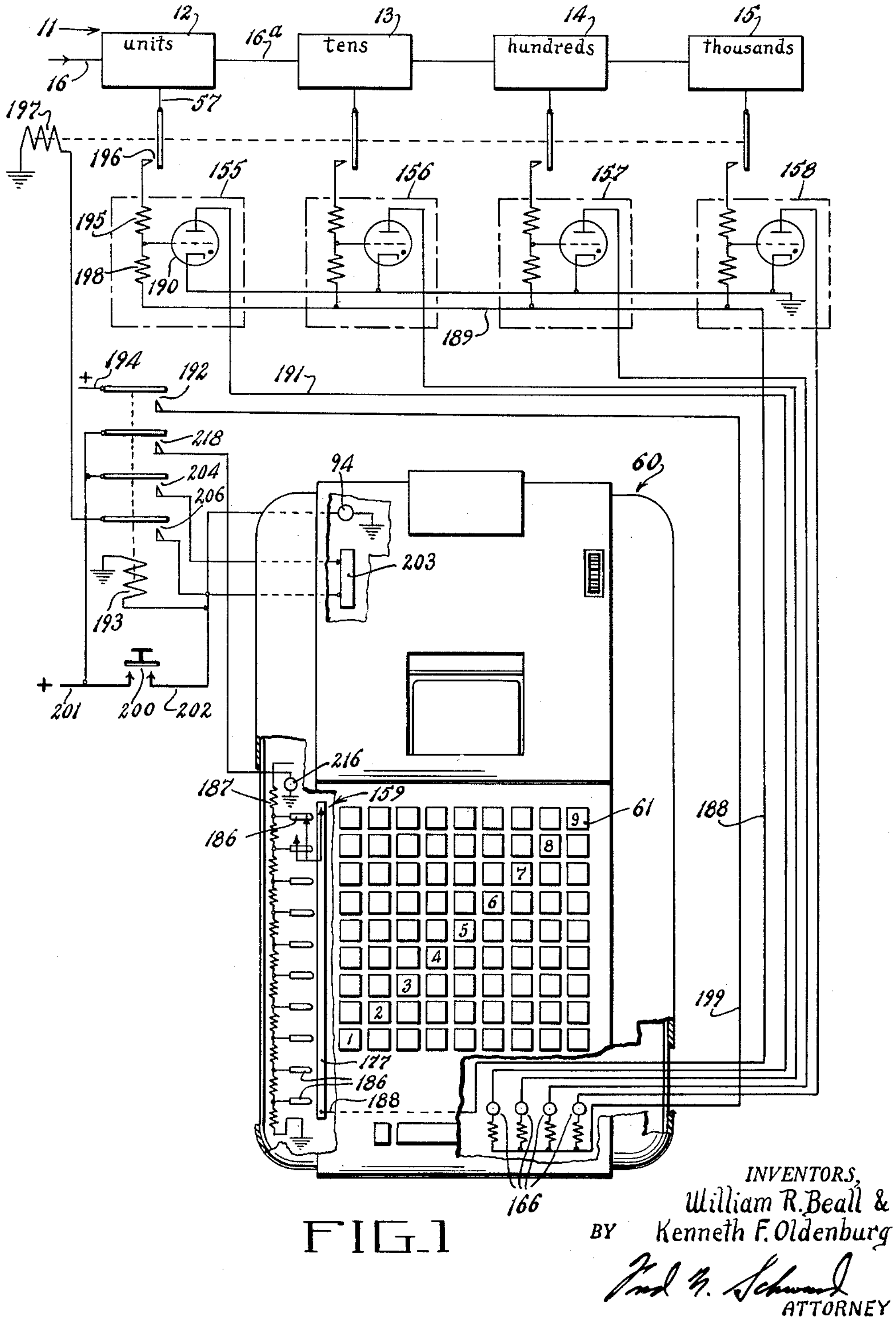
Fig. 1 is a schematic view of a combined pulse actuated counter and a readout system embodying a preferred form of the present invention.

Referring particularly to the preferred embodiment illustrated in Figs. 1 through 11, the read-out system shown therein is illustrated as associated with an electronic counter generally indicated at 11. The latter is of the binary coded decimal type and for the purpose of illustration is shown as comprising four counting decades 12, 13, 14 and 15. The input circuit 16 of the units decade 12 is connected to a suitable source (not shown) of pulses to be counted. The overcarry or tens carry circuit of each decade is connected to the input circuit of the next higher order decade through a line, like line 16*a*.

Pulses received over the input circuit 16 are registered by the units decade 12 and every tenth pulse is transferred via the line 16*a* to the tens decade 13. Similarly, every hundredth pulse is transferred to the hundreds decade 14, etc.

Figures 10, 11:
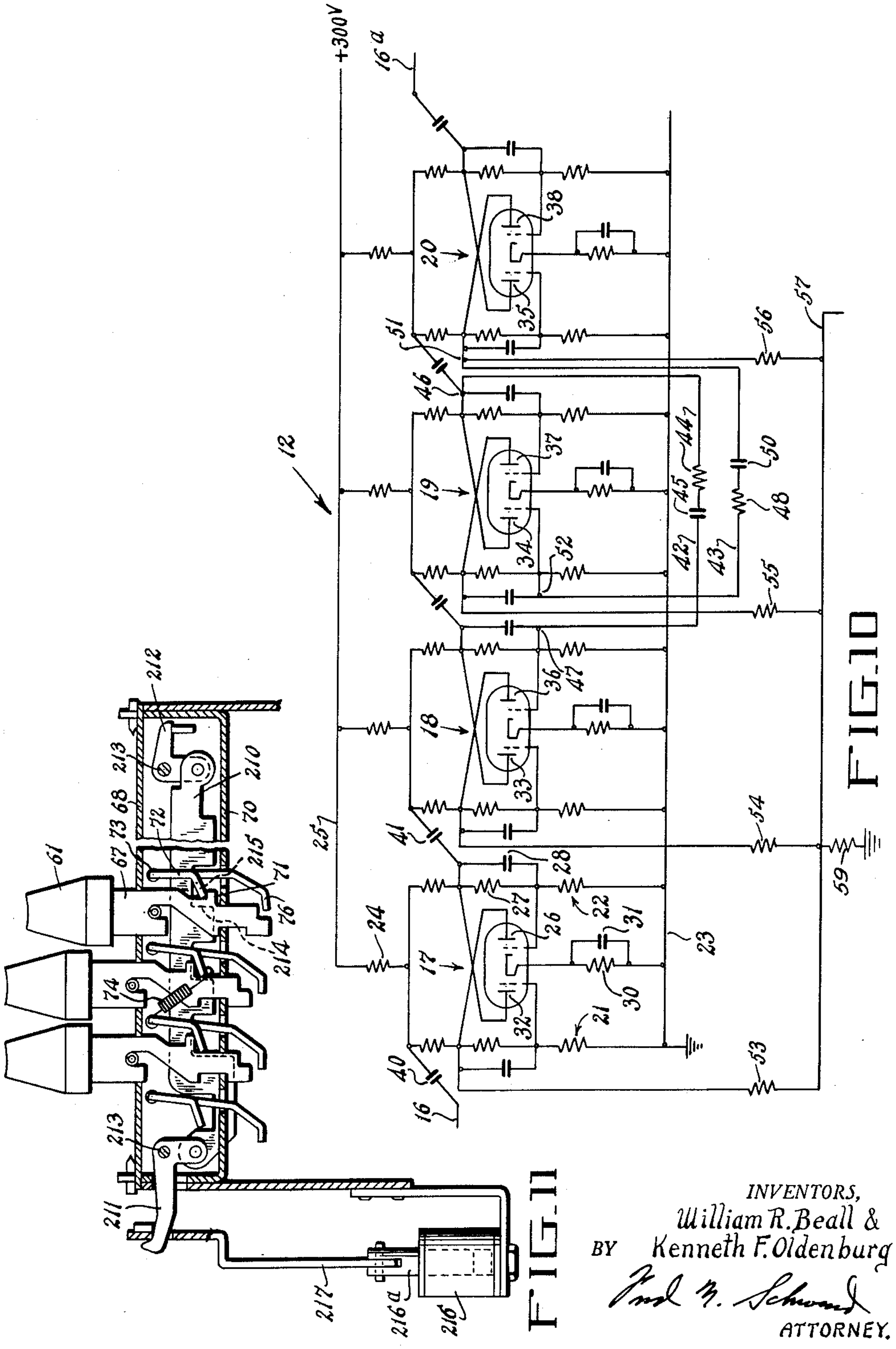
Fig. 10 is a schematic view of a binary coded decimal decade chosen for illustration in connection with the preferred form of the present invention.
Fig. 11 is a transverse sectional view through the keyboard and is taken along line 11—11 of Fig. 2.

The units decade 12 chosen for illustration in conjunction with the system embodying the present invention is shown in detail in Fig. 10 and it is to be understood that the remaining decades are similar in all respects.

Referring to Fig. 10, the counter decade 12 comprises four bi-stable multivibrator circuits 17, 18, 19 and 20 of the well-known Eccles-Jordan type. Each multivibrator unit includes a two-unit vacuum tube with left and right hand voltage divider circuits 21 and 22, respectively, associated with the respective units of the tube.

The various voltage divider circuits are connected at their lower ends to a ground line 23, and each pair is connected at its upper end through a common resistor 24 to an anode supply line 25.

The anode of each tube unit is cross-connected to the grid of the opposite tube unit through a parallel connected capacitor 28 and resistor 27, the latter comprising part of an associated voltage divider circuit. The cathode of each tube is connected to the ground line 23 through a bias resistor 30 and by-pass condenser 31, coupled in parallel.

Suitable counter reset circuitry (not shown) is provided to set the counter decade in a zero or standby condition in which the left hand unit of each tube is in a conducting state and the right hand unit is rendered nonconductive. Thus, in a zero condition the left hand anodes 32, 33, 34 and 35 are at a relatively low potential and the right hand anodes 26, 36, 37 and 38 are at a relatively high potential.

Negative pulses to be counted are applied through line 16 and a coupling condenser 40 to the upper ends of the voltage dividers 21 and 22 in the left hand counter stage 17. The falling wave front of each pulse will lower the potential of the left hand grid below the cut-off point, thereby raising the potential of the anode 32. This rise in voltage is applied through condenser 28 to the right hand grid of the tube, raising the latter above its cut-off potential and causing the right hand side of the tube to conduct and the left hand side to become non-conductive. The values of the voltage divider circuits 21 and 22 are so chosen that a rising wave front of the pulse transmitted through line 16 will be ineffective to change the condition of the circuit. Also, the incident positive pulse transferred through coupling condenser 41 to the next succeeding stage 18 will have no effect at this time.

The second pulse transmitted over line 16 will again lower the potential of both grids of the first tube to reverse the condition of the latter back to its original state. In so doing, the voltage potential of anode 32 will be lowered and a negative pulse will be transmitted through coupling condenser 41 to the upper ends of the voltage divider comprising the second stage 18 of the decade. The remaining stages of the decade are similar in circuitry and each is connected to the preceding stage in a similar manner.

However, since it is desired to cause each decade to count to ten and then automatically reset instead of resetting at the count of 16 as would otherwise be the case, two feed back circuits 42 and 43 are provided. The circuit 42, including a resistor 44 and condenser 45 in series, is connected between point 46 in the third stage 19 and point 47 in the second stage 18. The second circuit 43, also including a resistor 48 and condenser 50 in series, is connected between point 51 in the last stage 20 and point 52 in the third stage 19.

The above circuit connections are of such a nature that a pulse count will proceed according to the regular binary rules of progression until four pulses have been counted, at which time the stage 19 will have been advanced to register a binary one, i.e. the right hand side of the associated tube will be conducting and the left side non-conducting, while remaining stages will each register binary zero, in which the left hand side of the associated tube will be in conducting condition. The decade at this time will register the value 0010 representing the decimal digit "4."

Accordingly, the point 46 will at this time rise in potential and a positive pulse will be transferred through circuit 42 to point 47 in the second stage, causing the latter to reverse its condition, thus leaving the decade in a 0110 condition, representing the decimal digit "6." The fifth pulse will be registered in the usual manner as 1110 and the sixth pulse will be registered as 0001. Now, the right anode 38 of the tube in the last stage 20 will drop in potential transmitting a negative pulse over feed back circuit 43 to the point 52. This will reverse the condition of stage 19 leaving the decade registering 0011. As additional pulses are received, the counter will advance in the usual manner until nine pulses have been registered, leaving the counter in a 1111 condition. Thus, the tenth pulse will return the counter to a zero or 0000 condition.

An output indicating circuit is provided for each counter decade, the latter comprising relatively high value resistors 53, 54, 55 and 56 of different values connected at their lower ends to a common output line 57. The upper ends of the resistors are connected to respective ones of the right hand tube anodes 26, 36, 37 and 38. An additional resistor 59 of appropriate value is connected between line 57 and ground. Thus, the voltage potential applied to the output line 57 will depend on the condition of the counter decade at any time. The voltage potential applied to line 57 will be at a maximum at zero registration and will progress to successively lower values in equal steps as indicated by the line 250 in Fig. 9 as the pulse count progressively increases to nine. At the count of ten the voltage will abruptly rise back to its maximum.

Figure 9:
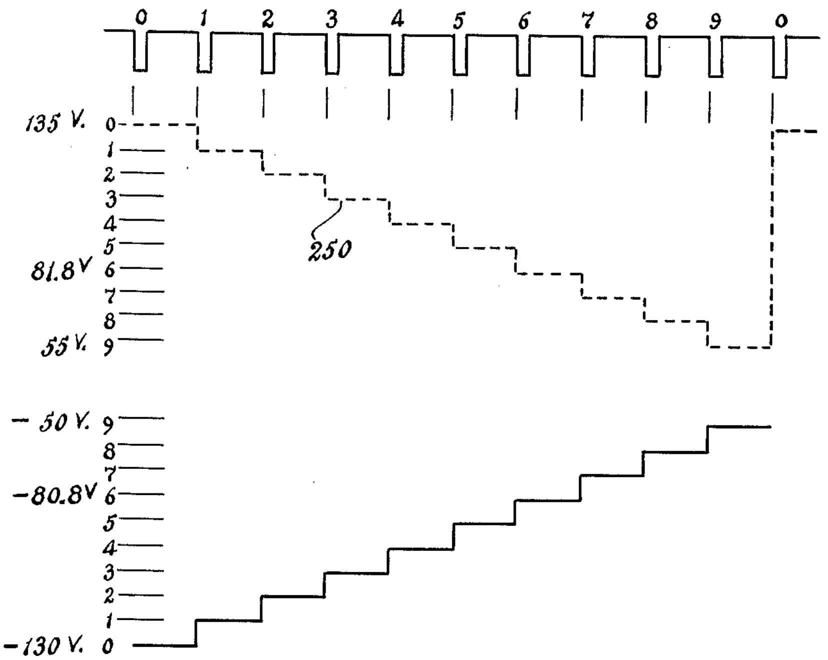
Fig. 9 is a schematic view illustrating the voltage forms developed for different values of registration of the counter and for different numerical positions of the rack drive.

For the purpose of illustration, the maximum voltage applied to the line 57, as indicated at Fig. 9, is 135 volts. This potential decreases in nine equal steps as the count registration progressively increases until at the registration at nine, the applied voltage is 55 volts.

*Readout machine*

The read-out system comprises a read-out machine generally indicated at 60, Fig. 1, which is capable of printing and accumulating amounts registered by the counter. The machine, which is illustrated in certain of its details in Figs. 2 to 8, inclusive, is based on the well-known Clary adding machine. The latter is disclosed and claimed in the patent to R. E. Boyden, No. 2,583,810, issued on January 29, 1952. The particular accumulating mechanism employed in this machine is disclosed and claimed in the patent to E. P. Drake, No. 2,572,696, issued on June 7, 1949.

Since the basic structure of the machine is disclosed in the above and other patents and is found in the commercially available Clary adding machine, only those portions that relate to or form part of the present invention will be disclosed herein in detail. Reference is therefore had to said patents for a disclosure of mechanisms not specifically disclosed herein. However, it is to be understood that the invention is not limited to the particular machine disclosed.

The machine includes a series of banks or orders of amount keys 61 on which amounts may be entered manually into the machine if desired. Each bank includes nine keys ranging in value from "0" to "9." Each amount key 61, when depressed, serves as a stop to differentially limit movement of an associated drive rack 62 which is effective to both drive an accumulator, generally indicated at 63, and to also set a printing mechanism, generally indicated at 64, to print an amount on a paper tape 65 carried over a platen 66.

*Keyboard*

The amount keys 61 are provided with key stems 67 slideably mounted in guide slots formed in keyplates 68 and 70 suitably secured to the frame of the machine.

Spring means (not shown) are provided for individually urging all of the keys into their upper illustrated positions. Means are provided for locking the keys in depressed position and for releasing any previously depressed key in the same key bank upon depression of a new key. For this purpose each key stem 67 is provided with a cam lobe 71 which, when the respective key is depressed, rocks a locking bail 72 pivoted at either end in trunnion bearings 73 formed in walls extending upwardly from the bottom keyplate 70. At the bottom of a key stroke, the cam lobe 71 passes below the locking bail 72 enabling the latter to retract partially under the urge of the spring 74 to a position wherein it latches the key stem depressed in the path of an associated shoulder 75 on the aligned actuator rack 62. The various shoulders 75 are so spaced relative to the associated key stems that the rack will advance a number of increments equal to the value of the depressed key before being arrested thereby.

A zero block 76 is formed on each locking bail 72, and when no amount key in a respective bank is depressed, the locking bail 72 of that bank will be spring held in a position wherein the zero block 76 is located directly in front of one of the rack shoulders 75, thereby preventing substantial movement of the rack during subsequent operation of the machine. However, when an amount key is depressed, the zero block 76 will be held out of the path of the aligned rack.

*Printer*

The various values registered on the racks 62 are recorded on the paper tape 65 by the printing mechanism 64.

The printer comprises a series of type wheels 77, each entrained with a respective one of the racks 62. Each type wheel has a series of type characters spaced therearound and ranging in value from zero to nine.

Each type wheel is rotatably mounted on an individual arm 78 carried by a printer control shaft 80. A gear 81 is integrally secured to each type wheel 77 and meshes with a second gear 82 also mounted on the associated arm 78.

Figure 2:
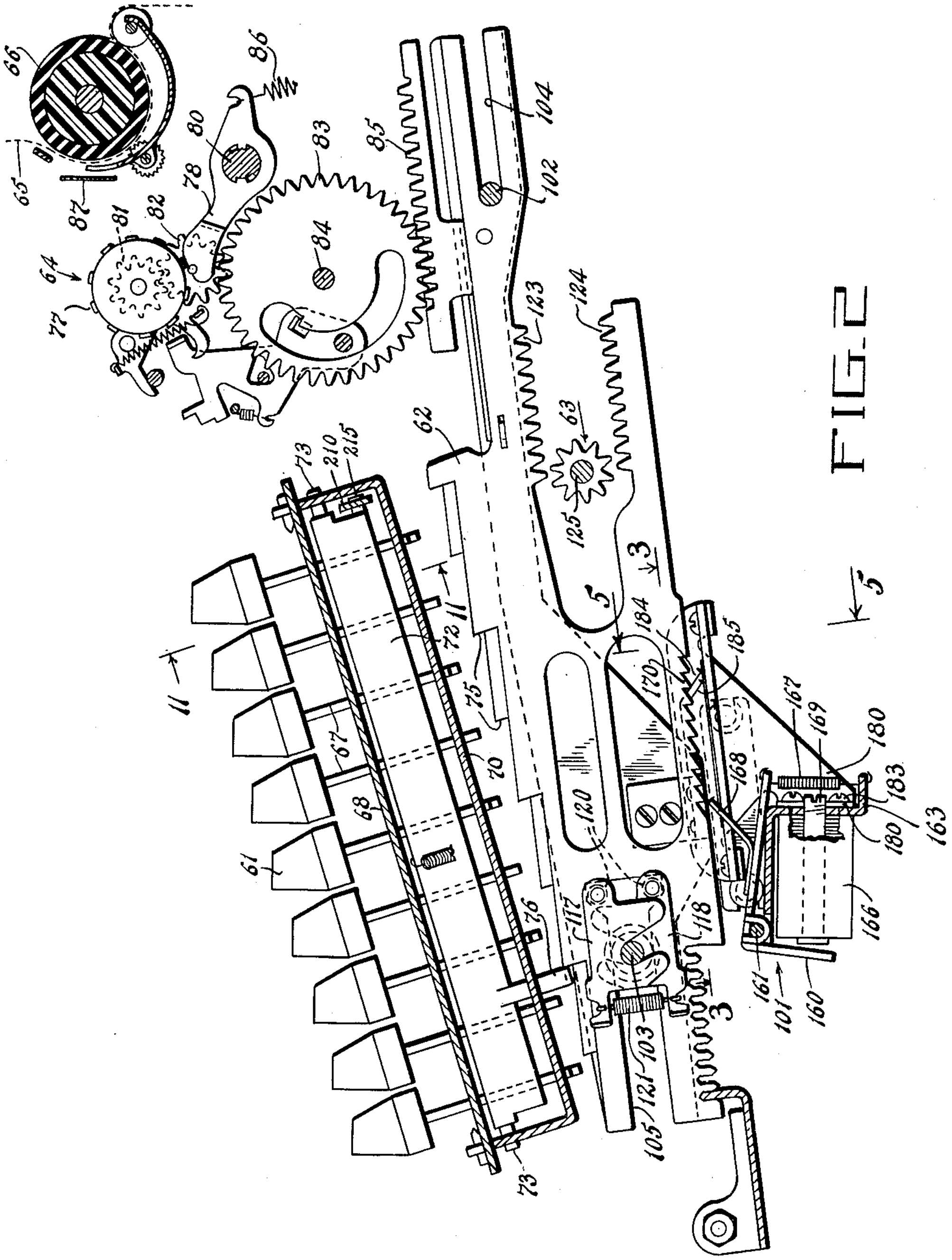
Fig. 2 is a longitudinal sectional view through a mechanical read-out machine comprising part of the read-out system.
Figure 3:
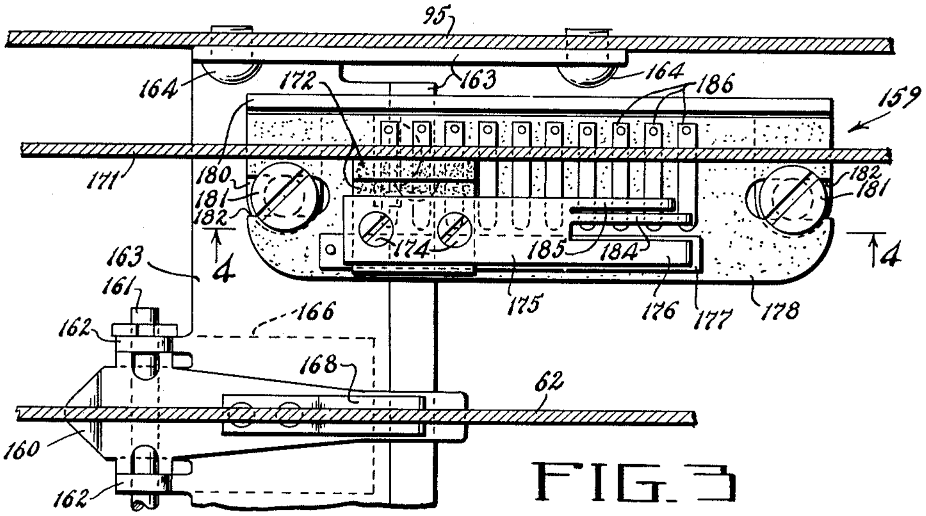
Fig. 3 is a sectional plan view taken along the line 3—3 of Fig. 2 illustrating particularly the resistance switching device.
Figure 4:
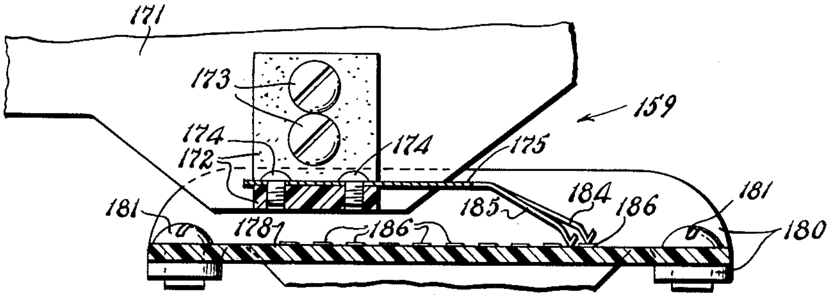
Fig. 4 is a sectional view taken along the line 4—4 of Fig. 3.
Figure 5:
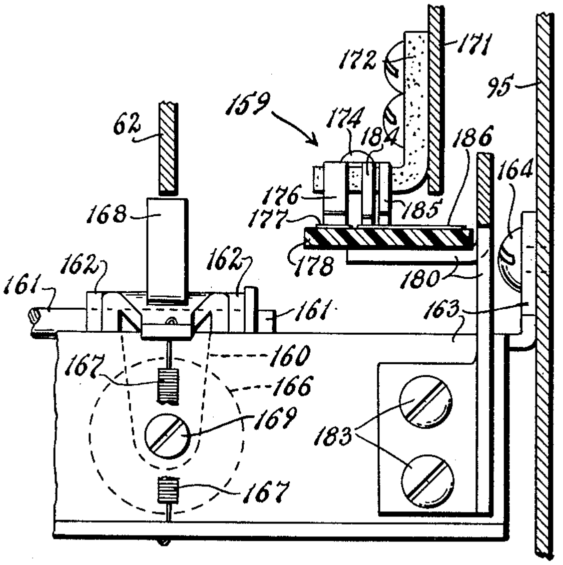
Fig. 5 is a sectional view taken along line 5—5 of Fig. 2.

Except during a printing operation, the arms 78 are held in their positions illustrated in Fig. 2 wherein each gear 82 meshes with an aligned idler gear 83. The various idler gears are rotatably mounted on a fixed shaft 84 and are continually maintained in mesh with rack sections 85 secured to respective ones of the racks 62.

During a printing phase of the machine cycle, and after the various racks have been differentially advanced to rotate the type wheels to proper printing positions, the printer control shaft 80 on which the various type wheel arms 78 are loosely keyed, is rocked clockwise, permitting tension springs 86 to correspondingly rock the type arms, carrying the type wheels 77 rearwardly into contact with a printing ribbon 87 to thereby print a registered amount on the tape.

*Machine drive instrumentalities*

Figure 8:
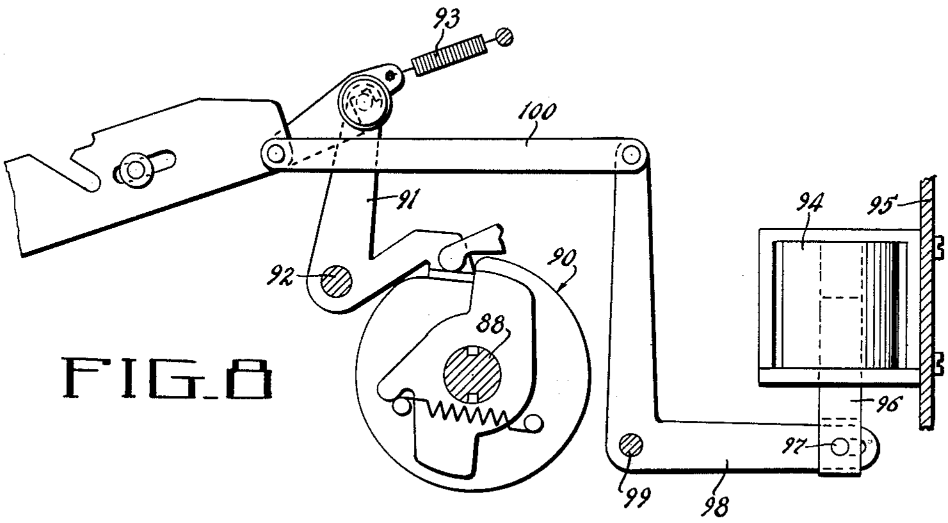
Fig. 8 is a side view illustrating a cyclic clutch of the read-out machine and part of the controls therefor.

Referring in particular to Fig. 8, the machine is driven by a main drive shaft 88 through a cyclically operable clutch, generally indicated at 90, from a suitable electric motor (not shown). The clutch is controlled by a clutch dog 91 pivoted at 92 and urged by a spring 93 into its illustrated position wherein it normally maintains the clutch in a disengaged condition.

For the purpose of causing engagement of the clutch, a solenoid 94 is provided, the latter being attached to a frame plate 95 of the machine. The armature 96 of the solenoid 94 is coupled through a pin and slot connection 97 to a bell crank 98 pivoted at 99 and connected to the clutch dog 91 through a link 100. Energization of the solenoid will be effective to rock the clutch dog 91 counterclockwise to effect engagement of the clutch. The latter is effective to rotate the drive shaft 88 through a complete revolution to effect a cycle of operation of the machine.

Means are provided for yieldably transmitting movement from the main shaft 88 to the various drive racks 62 so as to yieldably advance the latter through any number of increments up to nine until arrested by depressed amount keys if manual control is effected, or by an electromagnetically operated arresting device 101 (to be described hereinafter) when read-out operations take place.

Figure 7:
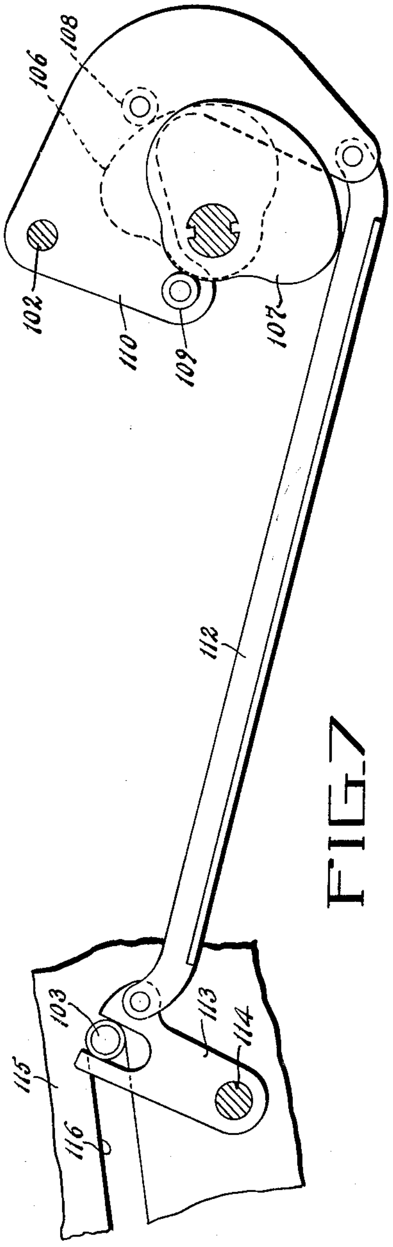
Fig. 7 is a sectional side view illustrating part of the rack driving mechanism.

The racks 62 are supported for fore and aft movement by shafts 102 and 103 embraced by guide slots 104 and 105, respectively, in each rack. The shaft 102 is fixedly supported by the machine frame whereas the shaft 103 is moved fore and aft of the machine in slots 116 (Fig. 7) formed in the side frame plates, i.e., 115. For this purpose a pair of complementary cams 106 and 107, Fig. 7, are keyed to the drive shaft 88 and cooperate with respective ones of rollers 108 and 109 mounted on a cam follower 110. The latter is pivotally supported on the shaft 102 and is connected by a line 112 to a bifurcated arm 113. The latter embraces one end of the rack support shaft 103 and is suitably fixed to a rock shaft 114 journaled in bearings provided in the side frame plates of the machine, one of which is shown at 115. An arm (not shown) similar to arm 113 is secured to an opposite end of the shaft 114 and embraces the opposite end of the shaft 103 whereby to insure parallel movement of the latter during its fore and aft travel.

The shaft 103 is suitably connected to each rack by pairs of opposed drive pawls 117 and 118. The latter are pivotally mounted on the shaft 103 and carry rollers 120 which normally engage in lateral depressions formed at the closed end of each rack slot 105. A spring 121 urges the pawls outwardly to normally hold the rollers 120 in driving engagement with the respective rack until the latter is arrested, at which time the rollers move out of the depressions and along the edges of the slot 105.

*Accumulator positioning controls*

The accumulator 63, Fig. 2, is raised or lowered to mesh the accumulator gears with upper or lower rack gear sections 123 and 124, respectively, of the various actuator racks 62, depending upon the type of operation to be performed. During normal read-out or add operations, the accumulator is raised to mesh with the rack section 123 whereas during totaling and subtractive operations the accumulator is lowered to mesh with the rack sections 124.

Figure 6:
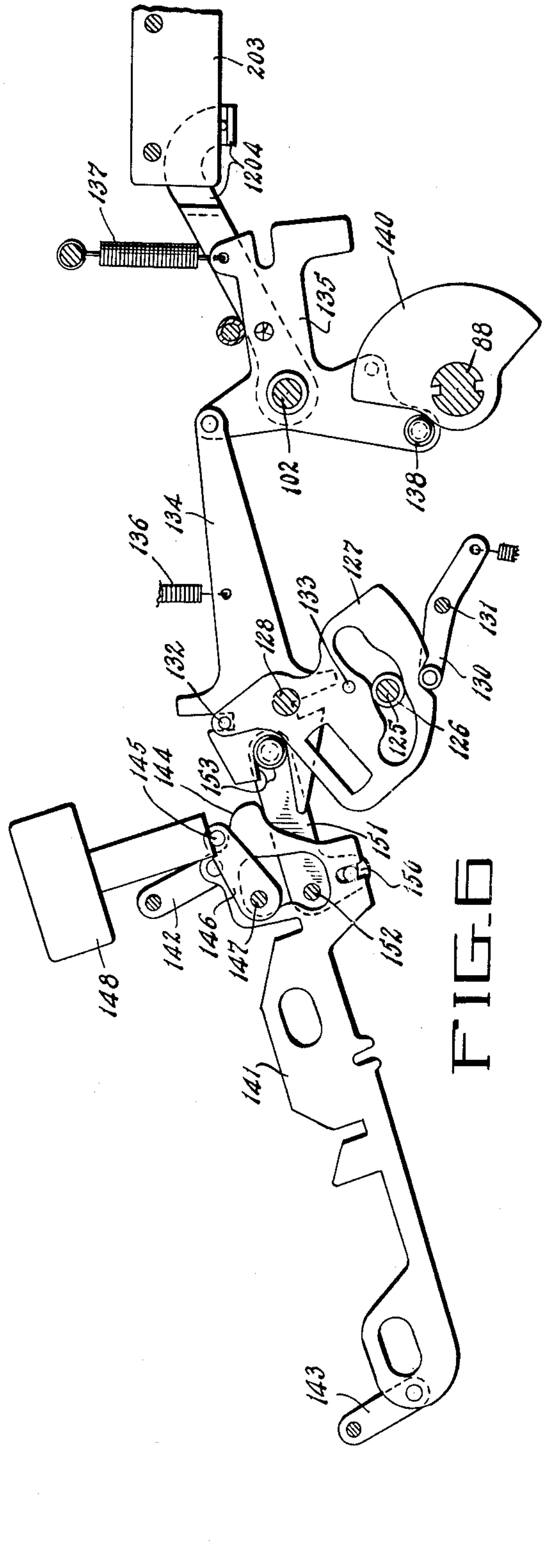
Fig. 6 is a sectional side view illustrating the accumulator controls.

Referring particularly to Fig. 6, a shaft 125, on which the various gears of the accumulator are rotatably mounted is provided with rollers at opposite ends thereof, one of which is shown at 126, embraced by cam slots formed in a box cam 127. The latter is pivoted on a frame stud 128 and is normally held in its illustrated neutral position by a centralizer 130 pivoted at 131 and spring urged clockwise to normally engage a centralized notch formed on the edge of the box cam, thus normally maintaining the accumulator in its illustrated neutral position.

A similar box cam (not shown) is operatively connected to cam 127 and is located to raise and lower the opposite end of the accumulator shaft 125, thus providing for parallel movement of the same.

The box cam 127 carries a pair of pins 132 and 133 located on opposite sides of its pivot support pin 128. The latter pins are adapted to be selectively engaged by a double hook member 134 which is pivotally connected to a cam follower 135. The hook member is normally held in its upper illustrated position by a tension spring 136 so as to normally embrace the upper pin 132 on the cam 127.

The cam follower 135 is urged clockwise by a tension spring 137 extending between the cam follower and a suitable frame pin to maintain a roller 138 thereof in engagement with the periphery of a cam 140 keyed on the drive shaft 88. This cam has a high portion extending substantially half way about its periphery whereby to rock the cam follower 135, and consequently the cam 127, to clockwise rocked positions where they are held during the first half of a machine cycle, i.e. during the forward movement of the rack drive shaft 103. Thus, the accumulator is held in mesh with the racks during forward movement of the latter.

Means are provided for lowering the hook member 134 in response to initiation of a totaling or subtract operation of the machine. For this purpose, a control bar 141 is provided, being supported for longitudinal movement by parallel links 142 and 143 suspended from the frame of the machine. The control bar has a camming surface 144 thereon underlying a pin 145 carried on an arm 146 fulcrummed at 147. The pin 145 underlies the stem of a depressible total bar 148.

The control bar 141 is coupled by a pin and slot connection 150 to a bell crank 151 pivotally supported at 152 and connected through a second pin and slot connection 153 to the hook member 134. Upon depression of the total bar 148, the control bar 141 will be advanced, rocking the bell crank 151 to lower the hook member 141 against the action of the spring 136 and into embracement with the pin 133. During the ensuing totaling cycle, the box cam 127 will be rocked counterclockwise, instead of clockwise, to lower the accumulator into mesh with the lower rack sections 124 of the actuator racks. Means (not shown) are provided for arresting the accumulator gears as they return to zero during such totaling operations so as to register the printing mechanism to print the amount previously registered on the accumulator.

*Automatic readout controls*

In accordance with the present invention, and during a read-out operation, the machine 60 is operated to yieldably advance the various actuator racks 62, or at least those racks corresponding in denominational value to the various decades of the counter 11. In time with this advancement of the racks, successively higher voltage potentials are applied to comparing or control circuits 155, 156, 157 and 158 associated with the counter decades 12, 13, 14 and 15, respectively. When a rack has reached a registering position corresponding in numerical value to the value registered by the corresponding counter decade, the associated comparing circuit will become effective to actuate the rack arresting device 101 for that particular rack.

*Rack arresting device*

Describing now the rack arresting devices 101 (Figs. 2 and 3) each of such devices comprises a combined arresting latch and magnet armature 160. The latter is pivotally supported on a pin 161 mounted in upstanding ears 162 formed on a cross brace 163. The brace is secured by screws 164 to the side plates like plate 95 of the machine. Each armature cooperates with an electro-magnet 166 attached to the cross plate 163 as by the threaded end of the armature core rod 169 and is normally spring held in its position illustrated in Fig. 2 by a spring 167 tensioned between the armature and the brace. In this position, a latching tip 168 is located directly below the path of a series of teeth 170 formed along the under edge of the associated actuator rack 62.

Whenever an electromagnet 166 is energized it will actuate its respective armature, rocking the same counterclockwise to move its latching tip 168 into engagement with one of the teeth 170 of the rack to block the same in one of its nine numerical positions.

*Bias switching device*

In order to apply successively higher voltage potentials to the various comparing circuits 155 and 158 in time with the advancement of the racks, a switching device generally indicated at 159 (Figs. 1, 3, 4 and 5) is provided. The latter comprises a slide 171 (see also Fig. 2) supported by the shafts 102 and 103 in a manner similar to the racks 62 but invariably movable with the shaft 103. A brush holder 172 of plastic or other insulating material is secured by screws 173 to the slide 171 and has mounted thereon, by means of screws 174, a bridging brush 175. One finger 176 of the brush is in continual sliding engagement with a conductor strip 177 suitably secured to the surface of a plate 178 of insulating material. The latter is adjustably mounted on a bracket 180 by means of clamp screws 181 which extend through elongated slots 182 in the plate and are threaded in the bracket. The bracket 180, in turn, is secured by screws 183 to the cross brace 163.

Long and short fingers 184 and 185, respectively, are formed on the brush 175 and are arranged to brush over a series of contact strips 186 suitably secured to the surface of the plate 178 and spaced apart distances equal to the spacing between the different numerical positions of the racks.

The contact strips 186 are electrically connected to different taps of a tapped resistor 187. The resistor is connected at its forward end to ground and is connected at its rearmost end to a source of negative direct current potential. The values of the tapped sections are so chosen that the rearmost or "zero" contact strip 186 has applied thereto −130 volts and the foremost or "nine" contact has applied −50 volts. The potentials applied to the intermediate contact strips progress in equal steps from the one limit to the other.

The contact strips 186 are of such width and the brush fingers 184 and 185 are so positioned that one or the other of such fingers is in engagement with the contact strip at all times.

The conductor strip 177 is electrically connected through line 188 (Fig. 1) to a bus line 189 so that the potential applied to the bus line will progressively decrease in minus value as the rack shaft advances forwardly through its nine increments of movement.

*Control circuits*

The various control or comparing circuits 155 and 158 each comprises a tube 190 of the gaseous discharge, thyratron type, such as, for example, the commercially available R.C.A. type 2D21 tube. The cathode of each tube is connected to ground and the anode thereof is connected through a line, like line 191, to the electromagnets 166 located in a bank of the machine corresponding in denominational value to the particular counter decade with which the comparing circuit is associated. The various electromagnets are connected in circuit with a common line 199 and normally open contacts 192 of a control relay 193 to a source of positive potential 194.

The ignitor of each tube is connected, on one hand, to a resistor 195 and normally open contacts 196 of a read-out relay 197 to the aforementioned output line 57 of the associated counter decade. The ignitor is also connected through a resistor 198 to the aforementioned bus line 189. Thus, as the net voltage potential applied by the bus line 189 and the counter decade output line 57 reaches the firing potential of the tube, the latter conducts to energize the respective one of the electromagnets 166 thereby arresting the corresponding rack in the appropriate numerical position.

In the example given (Fig. 9) the voltage applied by the counter decade output line 57 varies in equal steps between plus 135 volts (representing "zero") and 55 volts (representing "nine"). In a tube of the type 2D21 having a normal anode potential of, for example 250 volts, the firing potential of the ignitor is approximately minus 3 volts. Therefore, the resistance values of the tapped resistor sections of resistor 187 are so chosen that biasing voltages are presented to the bus line 189 in equal steps ranging from minus 134 volts to minus 54 volts, depending upon the position of the rack drive shaft at different rack positions.

Thus, if a counter decade registers "zero," its output line would present 135 volts whereas the bus line 189 would have applied thereto the full biasing value of minus 134 volts. Accordingly, the respective electromagnet 166 would be energized before the rack drive commences and the rack would be arrested in its "zero" position. However, if the counter decade registers the value "six," a voltage potential of approximately 81.8 volts would be applied to the output line 57. In this case the corresponding rack would be driven forwardly until the negative bias applied by the bus line 191 has dropped to approximately minus 80.0 volts during the sixth increment of advance of the rack. At this time, the electromagnet 166 will be energized to arrest the rack in its number "six" position.

Describing now the circuitry for effecting a read-out operation, whenever it is desired to read-out an amount registered in the counter, a switch 200 is momentarily closed, completing a circuit from a source 201 of positive potential through a line 202 to the aforementioned clutch control solenoid 94, thereby initiating a cycle of operation of the machine. Simultaneously, a circuit will be completed through the winding of relay 193 to energize the same.

A locking circuit is provided for the relay 193, comprising a normally open switch 203 located in series with normally open contacts 204 of the relay and connected across the switch 200. The switch 203 is controlled by an arm 1204, Fig. 6 attached to the aforementioned cam follower 135. Thus, at the start of a read-out operation the follower 135 and arm 1204 will cause the switch 203 to close, holding the relay 193 energized throughout the forward advance of the racks. The switch will be opened midway through the machine cycle allowing the relay 193 to be deenergized during the latter half of the machine cycle, i.e. during the return of the racks to their illustrated position.

Since, during a read-out operation, the amount keys 61 are not normally used to differentially control the extent of movement of the racks, means must be provided to release the various zero blocks 76 (Figs. 2 and 11) from blocking engagement with those racks which are controlled by the read-out system through the arresting devices 101. For this purpose, a key latch release bar 210 is provided, being supported for lengthwise movement by bell cranks 211 and 212 pivotally suspended from frame pins 213.

The bar 210 has shoulders 214 formed thereon and engageable with extensions 215 on the locking bails 72 of those orders containing arresting devices 101.

A solenoid 216 is provided for actuating the bar 210 to release the locking bails in the pertinent orders. The armature 216*a* of the solenoid 216 is coupled through a link 217 to the bell crank 211 and becomes effective, upon energization of the solenoid, to move the bar 210 to the right in Fig. 11, thereby rocking the bails 72 sufficiently counterclockwise to remove the zero blocks 76 from blocking relation with the racks.

In order to energize the solenoid 216 during the first half of a machine cycle, the coil thereof is placed in series with normally open contacts 218 of the relay 193, the contacts being connected to the source 201 of positive potential.

Contacts 206 of relay 193 are effective during energization of the relay to energize the read-out control relay 197, thereby connecting the various output lines of the different counter decades 12 to 15 to their respective control circuits only during the actual read-out operation. In this respect, it will be noted that, although the pulse input into the counter must be interrupted during the early portion of a machine cycle, i.e. during differential advance of the racks 62, the same may be resumed during the latter half of the cycle, i.e. during return of the racks.

*Modified read-out system*

Figures 12, 13:
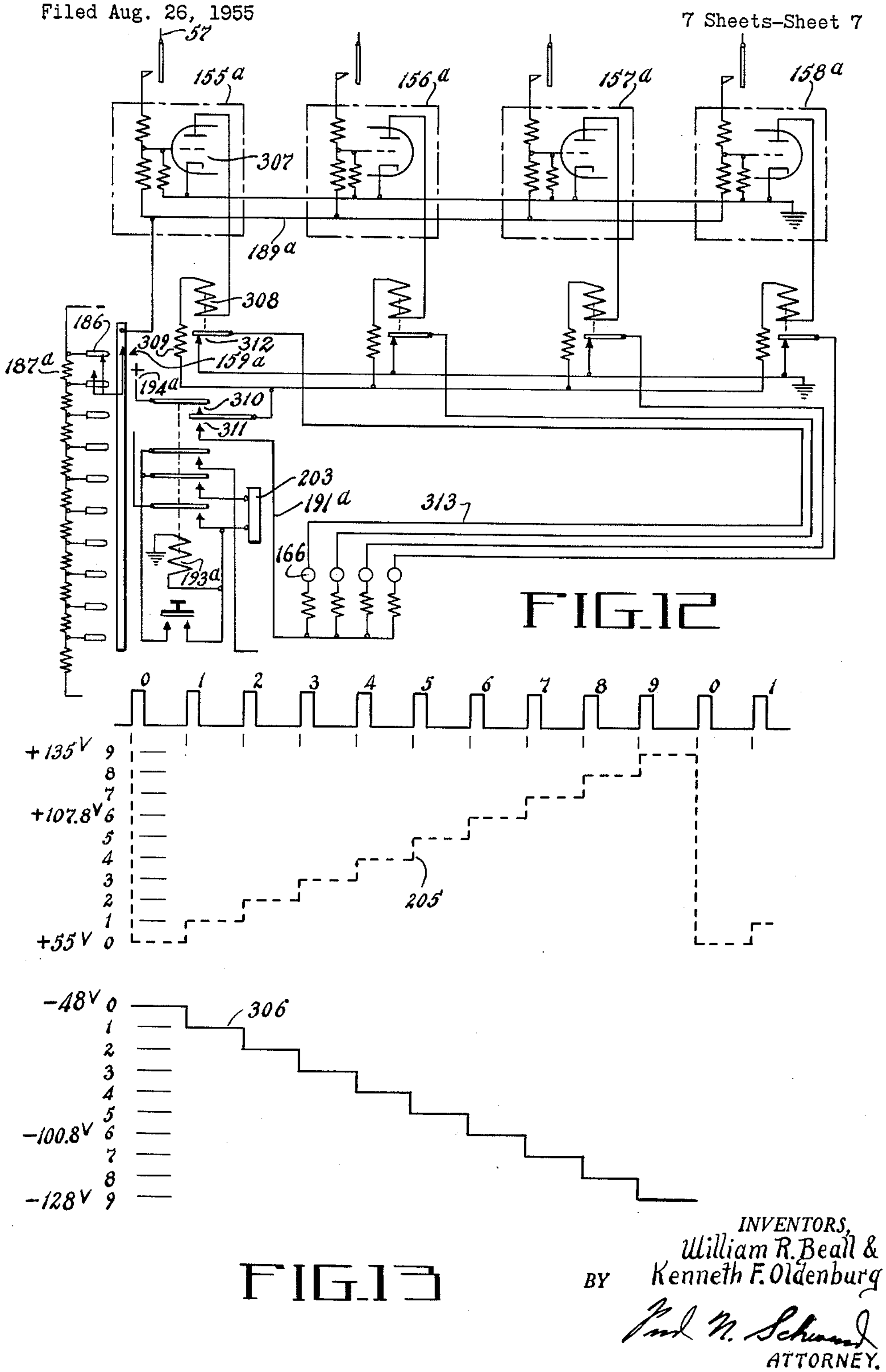
Fig. 12 is a schematic view of a modified form of the invention.
Fig. 13 is a schematic view illustrating the voltage forms developed in accordance with different values of registration of a counter having ascending values of voltage output registration, and corresponding voltage forms developed for different numerical positions of the rack drive.

Figs. 12 and 13 illustrate a modified read-out system for use in conjunction with a registering device such as an electronic counter having an ascending voltage potential output which advances in a step relation in accordance with aggressively higher registered values. Such a counter is shown, for example, in the patent to Houghton 2,540,524 noted hereinabove.

In this form of the invention, elements similar to elements shown in the preferred embodiment are identified by similar reference numerals. Also, in the example illustrated, and referring particularly to Fig. 13, the voltage potential applied by any counter decade to its output line, i.e. 57, is indicated at 205 as advancing in equal steps from plus 55 volts (representing "zero") to plus 135 volts (representing "nine").

On the other hand, the resistor 187*a* is connected at opposite ends to power sources of different negative potential and is so tapped as to present approximately minus 48 volts at the "zero" contact strip 186 and minus 128 volts at the "nine" contact strip of the switching device 159*a*. As in the previously described embodiment, the resistor 187*a* is tapped to present successively varying voltage steps of equal difference to the bias line 189*a*, as indicated by line 306.

In this case, however, a hard vacuum tube 307 of the triode type is placed in each control circuit, i.e. 155*a*, in place of the thyratron type, previously described. The tube chosen for the present purpose is commercially available under the trade name Tungsol, No. 5687. With a normal anode potential of, for example, 250 volts, the tube will become conductive when the bias on its grid rises above approximately minus 5 volts. The anode circuit of each tube, i.e. 307, has located in series therewith the winding of a respective relay 308 and a limiting resistor 309. The various anode circuits are connected in a circuit including normally open contacts 310 of relay 193*a* to the source of positive potential 194*a*. The contacts 310 form a made-before-make set effective to close before closing of a second set of contacts 311 of the relay 193*a*. The latter contacts are effective to connect the source of potential 194*a* through line 191*a* to one side of each of the electromagnets 166 in each of the different orders of the machine. The other side of each electromagnet is connected through a respective line, like line 313, and normally closed contacts 312 of the respective relay, like relay 308, to ground. Accordingly, if a counter decade registers, for example, "six," it will present a voltage potential of 107.8 volts to its output line 57. At the initiation of a read-out operation, at which time the potential of minus 58 volts is applied to the bus line 189*a*, the respective control tube 307 will be in a conducting condition and the relay 308 energized, opening contacts 312. Therefore, the associated rack will be allowed to advance, and as it passes through its sixth increment of movement, the negative bias applied to bus line 189*a* will change to a minus 100.8 volt potential. Since the net bias on the grid of tube 307 has now dropped below minus 5 volts, the tube will extinguish and the relay will deenergize thereby allowing contacts 312 to close to energize the respective magnet 166 and arrest the rack at its numerical "six" position.

Although we have described our invention in detail and therefore have used certain terms and languages herein, it is to be understood that the present disclosure is illustrative rather than restrictive, particularly in regard to the type of machine to which it is applied and that changes and modifications may be made without departing from the spirit or scope of the invention as set forth in the claims appended hereto. For example, the term "registering mechanism," in the claims, is intended to be generic to printing mechanism, accumulating mechanism or other mechanism which is capable of registering, displaying or utilizing values or amounts. Also, the term "value registering device" is intended to be generic to any device capable of registering different values. Further, according to the broader aspects of the invention, the relationship of the electromagnets 166 and springs 167 may be reversed so that the springs tend to move the armatures 160 into rack arresting positions. In such case, the electromagnets would normally hold the armatures out of rack arresting positions until the racks reach positions corresponding to the amounts registered by the counter decades.

Having thus described the invention what we desire to secure by United States Letters Patent is:

1. In a read-out system for a multi-decade value registering device, each decade having an output circuit effective to produce distinctly different registering potentials in accordance with different values, respectively, registered by a respective decade, the combination of multi-denominational amount registering mechanism having a registering element for each denomination thereof, reciprocable differential actuators for advancing said registering elements during movement of said actuators in one direction, drive means for incrementally advancing said actuators, a plurality of electromagnetic devices for controlling respective ones of said actuators, a plurality of control circuits for respective ones of said electromagnetic devices, each of said control circuits having two input leads, means connecting each of said output circuits to one of the input leads of a respective one of said control circuits, means presenting a single series of terminals of progressively different potentials, means operable by said driving means for successively connecting the others of said input leads to different ones of said terminals in concert with advancement of said actuators whereby to energize said electromagnetic devices to cause said registering elements to register amounts corresponding to amounts registered by the decades of said registering devices, and means operable upon movement of said actuators in the opposite direction for disabling said control circuits.

2. In a read-out system for a multi-decade value registering device, each decade having an output circuit effective to produce distinctly different registering potentials in accordance with different values, respectively, registered by a respective decade, the combination of multi-denominational amount registering mechanism having a registering element for each denomination thereof, reciprocable differential actuators for advancing said registering elements, drive means for incrementally advancing said actuators, a plurality of electromagnetic devices for controlling respective ones of said actuators, a plurality of control circuits for respective ones of said electromagnetic devices, each of said control circuits having two input leads, means connecting each of said output circuits to one of the input leads of a respective one of said control circuits, an additional control circuit including a source of potential and a single multi-tapped resistor, means operable by said drive means for successively connecting the others of said input leads to progressively different taps of said resistor in concert with advancement of said actuators whereby to energize said electromagnetic devices when said registering elements register amounts corresponding to amounts registered by the decades of said registering devices.

References Cited in the file of this patent

UNITED STATES PATENTS

| | | |
|---|---|---|
| 773,515 | Muzzy | Oct. 25, 1904 |
| 997,983 | Foote | July 18, 1911 |
| 1,005,555 | Kettering | Oct. 10, 1911 |
| 2,279,232 | Graham | Apr. 7, 1942 |
| 2,539,623 | Heising | Jan. 30, 1951 |
| 2,595,045 | Desch et al. | Apr. 29, 1952 |
| 2,697,551 | Rench | Dec. 21, 1954 |
| 2,733,432 | Breckman | Jan. 31, 1956 |
| 2,757,862 | Boyden et al. | Aug. 7, 1956 |

OTHER REFERENCES

"Step Switch Converter Digitizes Analog Data," Bennett and Low, November 1953, "Electronics," pp. 164–5.